United States Patent [19]
Yoo

[11] Patent Number: 5,664,541
[45] Date of Patent: Sep. 9, 1997

[54] DIESEL ENGINE HAVING AUXILIARY COMBUSTION CHAMBER

[75] Inventor: Chol-Ho Yoo, Seoul, Rep. of Korea

[73] Assignee: Kia Motors Corporation, Seoul, Rep. of Korea

[21] Appl. No.: 679,501

[22] Filed: Jul. 12, 1996

[30] Foreign Application Priority Data

Mar. 14, 1996 [KR] Rep. of Korea ............... 96-4819

[51] Int. Cl.$^6$ .................................................. F02M 19/00
[52] U.S. Cl. ........................................................ 123/275
[58] Field of Search ............................ 123/275, 254, 123/286, 257

[56] References Cited

U.S. PATENT DOCUMENTS

| 4,446,831 | 5/1984 | Artman | 123/286 |
| 4,483,291 | 11/1984 | Artman | 123/286 |
| 4,831,982 | 5/1989 | Baranescu | 123/275 |
| 4,872,433 | 10/1989 | Paul et al. | 123/257 |
| 5,277,159 | 1/1994 | Webster | 123/254 |

Primary Examiner—Raymond A. Nelli

[57] ABSTRACT

A diesel engine having an auxiliary combustion chamber which includes a cylindrical auxiliary combustion chamber, which is vertically formed in the center part of the cylinder head so as to be able to communicate with a main combustion chamber; a fuel injection device, mounted above the auxiliary combustion chamber of the cylinder head and which injects fuel into the auxiliary combustion chamber; and a piston, having a protrusion part, protruding to a fixed height in the center and upper part of the piston and of slightly tapered shape so that a communicating hole of the auxiliary combustion chamber, which communicates with the main combustion chasmber, can be opened and closed.

1 Claim, 2 Drawing Sheets

DIESEL ENGINE HAVING AUXILIARY COMBUSTION CHAMBER

FIELD OF INVENTION

The present invention relates to a diesel engine and, more particularly, to a diesel engine having an auxiliary combustion chamber, in which size of a communicating hole that communicates with a main combustion chamber varies during combustion by a protrusion part formed in a piston so that nitrogen oxide compounds and exhaust particulates can simultaneously be reduced.

PRIOR ART

Generally, in gasoline engines, a thoroughly mixed mixture of air and fuel is sucked into a cylinder, and after being compressed, it is ignited and combustion of the fuel results. In diesel engines, fuel is injected into air that is at a high temperature and highly pressurized in a cylinder and is combusted through its self-ignition.

A combustion chamber of diesel engines must meet the following conditions:

1. Injected fuel must realize combustion in the shortest amount of time possible.
2. Mean effective pressure must be high.
3. The specific fuel consumption must be low.
4. The combustion state must be good during high RPMs.
5. Starting must be easy.
6. Diesel engine knocking must be minimal.

One method of meeting the above conditions is to ensure easy mixture of air and the injected fuel in the combustion chamber of diesel engines. Namely, the mixing of fuel and air is accelerated by a vortex flow which is created at the end of the compression stroke. Furthermore, the mixing of fuel and air is accelerated by the use of high pressure proceeded at the firing stroke. In other words, the combustion chamber must take on special shape to allow for the easy mixture of fuel and air.

The different kinds of combustion chambers in diesel engines include direct-injection, pre-combustion chamber, vortex chamber, and air chamber types.

In FIG. 1, a diesel engine having a vortex chamber is illustrated. A diesel engine having a vortex chamber includes a main combustion chamber 1b, formed in a cylinder bore 1a by a piston 2; a vortex chamber 11, which is globe-shaped and formed on one side of a cylinder head 3 and has a blow-off hole 11a that is connected to the main combustion chamber 1b; a glow plug 12 for heating air in the vortex chamber when starting and which is mounted in the cylinder head 3 such that one end protrudes into the vortex chamber 11; and a fuel injection device 10 provided in the cylinder head 3 for injecting fuel into the vortex chamber.

The volume of the vortex chamber 11 makes up 70–80% of the combined volume of the main combustion chamber 1b and vortex chamber 11, and the size of the blow-off hole 11a is roughly 1–3.5% of that of the piston 2.

The combustion process for a diesel engine having a vortex chamber will now be explained.

During the compression stroke, the air, which flows into the vortex chamber 11 through the blow-off hole 11a from the main combustion chamber 1b, creates a strong vortex in the vortex chamber 11. The fuel, which is injected into the vortex chamber 11 by the fuel injection device 10, is quickly mixed with the air as a result of the vortex, it then ignites and combustion results. This is ejected into the main combustion chamber 1b through the blow-off hole 11a. The fuel that has not yet undergone combustion is ejected into the main combustion chamber 1b along with combusted gas, and after being mixed with new air in the main combustion chamber 1b, it is ignited. Here, the majority of the fuel undergoes complete combustion in the vortex chamber 11.

Nitrogen oxide compounds ($NO_x$) and exhaust particulates, which are air-pollutants, are created in opposing combustion conditions. When too much air is used in combustion, nitrogen oxide compounds are produced, and when too much fuel is used in combustion, exhaust particulates are produced. In the prior art diesel engine, therefore, if combustion conditions are such that one of the above two is reduced, the other is increased, and vice versa. Therefore, it is extremely difficult to reduce the two compounds simultaneously.

SUMMARY OF THE INVENTION

It is an object of the present invention to provide a diesel engine having an auxiliary combustion chamber in which a size of a communicating hole that communicates with a main combustion chamber varies during combustion by a protrusion part formed in a piston so that nitrogen oxide compounds and exhaust particulates can simultaneously be reduced.

To achieve the above object a diesel engine having an auxiliary combustion chamber according to the present invention provides a cylindrical auxiliary combustion chamber, which is vertically formed in the center part of the cylinder head so as to be able to communicate with a main combustion chamber; a fuel injection device, mounted above the auxiliary combustion chamber of the cylinder head and which injects fuel into the auxiliary combustion chamber; and a piston, having a protrusion part, protruding to a fixed height in the center and upper part of the piston and which has a slightly tapered shape so that the communicating hole of the auxiliary combustion chamber, which communicates with the main combustion chamber, can be opened and closed.

In the above diesel engine having an auxiliary combustion chamber of the present invention, at the start of combustion, the creation of nitrogen oxide compounds is prevented, and at the end of combustion, and by the vortex created from the abrupt increase in size of the communicating hole of the auxiliary combustion chamber when the piston descends, the development of exhaust particulates is restrained. Therefore, the present invention simultaneously reduces the creation of nitrogen oxide compounds and exhaust particulates.

BRIEF DESCRIPTION OF THE DRAWINGS

These and other features, aspects, and advantages of the present invention will become better understood with regard to the following description, appended claims, and accompanying drawings wherein:

DETAILED DESCRIPTION

Figure 1:
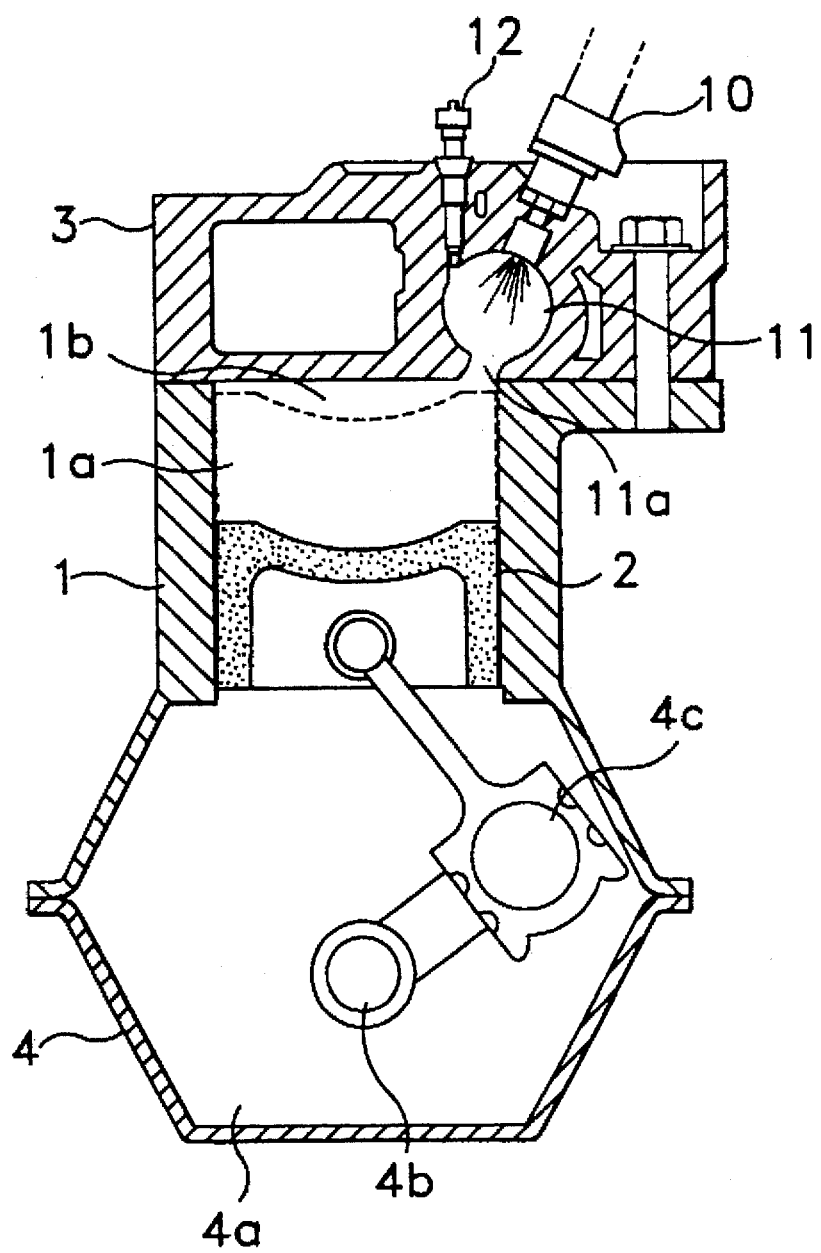
FIG. 1 is a sectional view diesel engine having a vortex chamber according to the prior art.
Figure 2:
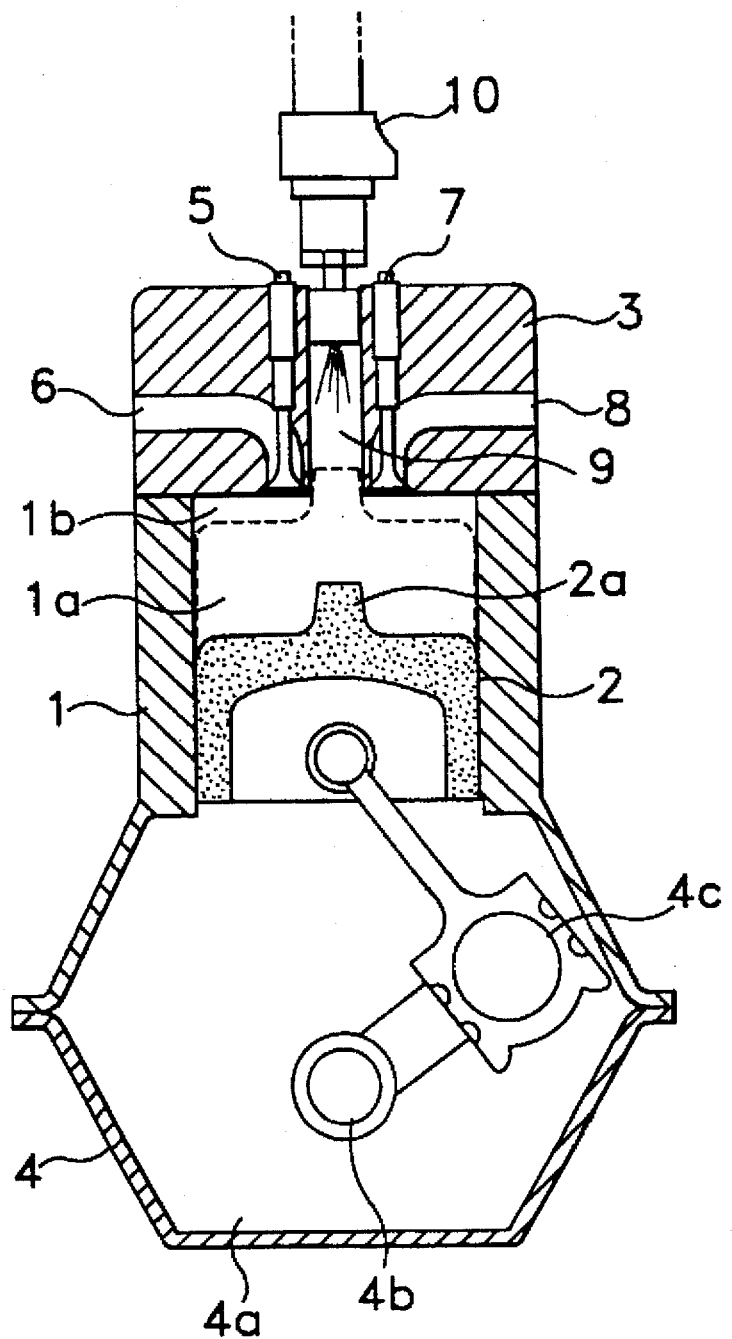
FIG. 2 is a sectional view of a diesel engine having an auxiliary combustion chamber according to the present invention.

As is illustrated in FIG. 2, the diesel engine of the present invention comprises a cylinder block 1 with a bore 1a formed inside of it; a crank case 4, mounted to the lower part of the cylinder block 1 and which forms a crank chamber 4a;

and a cylinder head 3, mounted to upper part of the cylinder block 1. A crank shaft 4b is provided in the crank chamber 4a, a piston 2 is mounted in the cylinder bore 1a such that it is able to undergo a reciprocate in a up and down motion, and a connecting rod 4c connects the piston 2 and crank shaft 4b. The piston 2 and crank shaft 4b are connected by a connecting rod 4C. A main combustion chamber 1b is formed in the cylinder bore 1a by the piston 2. A intake port 6, which communicates with the main combustion chamber 1b by the operation of a intake valve 5, is formed on one side of the cylinder head 3. The intake valve 5 is provided between the intake port 6 and main combustion chamber 1b to open and close the connection between the two. An exhaust port 8, connected to an exhaust manifold (not shown) is formed on the other side of the cylinder head 3, and an exhaust valve 7 is provided between the valve port 8 and main combustion chamber 1b to open and close this connection. A cylindrical auxiliary combustion chamber 9, which communicates with the main combustion chamber 1b is vertically formed in the center part of the cylinder head 3. A fuel injection device 10 is provided above the auxiliary combustion chamber 9 of the cylinder head 3 which injects fuel into the auxiliary combustion chamber 9.

The piston 2 has a protrusion part 2a protruding to a fixed height in the center and upper part of the piston. This protrusion part 2a has a slightly tapered shape so that the communicating hole of the auxiliary combustion chamber 9, which communicates with the main combustion chamber 1b, can be opened and closed, depending on the location of the piston 2.

The following is the combustion process for the diesel engine with the above structure of the present invention.

During the compression stroke, air first flows into the auxiliary combustion chamber 9 by the upward motion of the piston 2. Fuel, is then injected by the fuel injection device 10 and is mixed with the air which results in self-ignition that starts combustion. In the present invention, a vortex is not created when air is sucked in the auxiliary chamber 9 in contrast to the prior art for diesel engine having a vortex chamber. As a result, the fuel, which is injected into the auxiliary combustion chamber 9 by the fuel injection device 10, is combusted in a state where it is not completely mixed with the air and is in excess.

Next, the protrusion part 2a, which was blocking the communicating hole of the auxiliary combustion chamber 9, opens the communicating hole when the piston 2 descends, and the combusted gas, fuel that has not been ignited, and the air from the auxiliary combustion chamber 9 flows out into the main combustion chamber 1b. At this time, as the size of the communicating hole of the auxiliary combustion chamber 9 is abruptly enlarged, the speed at which the combusted gas, fuel that has not been ignited, and air from the auxiliary combustion chamber 9 flows into the main combustion chamber is increased, whereby, a vortex is created. Accordingly, the mixing of fuel and air is accelerated and combustion occurs in a lean-burning state.

Therefore, in the above diesel engine having an auxiliary combustion chamber of the present invention, at the start of firing stroke, the creation of nitrogen oxide compounds is prevented, and at the end of the firing stroke, by the vortex created from the abrupt increase in size of the communicating hole of the auxiliary combustion chamber when the piston descends, the development of exhaust particulates is restrained. Hence, the present invention simultaneously reduces the creation of nitrogen oxide compounds and exhaust particulates.

Although preferred embodiments of the present invention have been described in detail hereinabove, it should be clearly understood to those skilled in the present art that many variations and/or modifications of the basic inventive concepts herein, will still fall within the spirit and scope of the present invention, as defined in the appended claims.

What is claimed is:

1. A diesel engine having an auxiliary combustion chamber comprising:

a cylinder block with a bore formed inside of it;

a cylinder head mounted to the upper part of the cylinder block;

a crank case, mounted to the lower part of the cylinder block and defining a crank chamber;

a crank shaft, provided in the crank chamber;

a piston, provided in the cylinder bore, that reciprocates in a up and down motion, and on which a protrusion part is formed at its center portion to a fixed height and slightly tapered shape for opening and closing a communicating hole formed in the auxiliary combustion chamber;

a connecting rod, which connects the piston and crank shaft;

a main combustion chamber, formed in the cylinder bore by the piston;

a intake port, which communicates with the main combustion chamber and formed on one side of the cylinder head;

a intake valve, provided between the intake port and main combustion chamber to open and close the connection between the two;

an exhaust port, connected to an exhaust manifold and formed on the other side of the cylinder head;

an exhaust valve, which is provided between the valve port and main combustion chamber to open and close this connection;

a cylindrical auxiliary combustion chamber, which communicates with the main combustion chamber and is vertically formed in the center part of the cylinder head; and a fuel injection device, provided above the auxiliary combustion chamber of the cylinder head which injects fuel into the auxiliary combustion chamber.

* * * * *